United States Patent [19]
Ogata et al.

[11] Patent Number: 5,546,236
[45] Date of Patent: Aug. 13, 1996

[54] WIDE-ANGLE PHOTOGRAPHIC LENS SYSTEM

[75] Inventors: Yasuji Ogata; Toshiro Baba, both of Hachioji, Japan

[73] Assignee: Olympus Optical Co., Ltd., Tokyo, Japan

[21] Appl. No.: 208,836

[22] Filed: Mar. 11, 1994

[30] Foreign Application Priority Data

Mar. 12, 1993 [JP] Japan .................................... 5-077420
Mar. 12, 1993 [JP] Japan .................................... 5-077456
Jul. 16, 1993 [JP] Japan .................................... 5-197704

[51] Int. Cl.⁶ .................................................. G02B 15/02
[52] U.S. Cl. .......................... 359/794; 359/795; 359/784; 359/785; 359/793
[58] Field of Search ................................ 359/794, 690, 359/795, 793, 691, 692, 689, 784, 785

[56] References Cited

U.S. PATENT DOCUMENTS 4,666,257  5/1987  Tanaka et al. ............................ 359/690

FOREIGN PATENT DOCUMENTS

| | | |
|---|---|---|
| 55-105216 | 8/1980 | Japan . |
| 56-91206 | 7/1981 | Japan . |
| 57-116313 | 7/1982 | Japan . |
| 59-147312 | 8/1984 | Japan . |
| 60-176011 | 9/1985 | Japan . |
| 64-90409 | 4/1989 | Japan . |
| 2208616 | 8/1990 | Japan . |

*Primary Examiner*—David C. Nelms
*Assistant Examiner*—Vu A. Le
*Attorney, Agent, or Firm*—Cushman, Darby & Cushman

[57] ABSTRACT

A wide-angle photographic lens system comprising a front lens unit having a positive refractive power, an aperture stop and a rear lens unit having a positive refractive power or a negative refractive power; the front lens unit comprising at least one positive lens component and at least one negative lens component, whereas said rear lens unit consisting of a positive lens component having a convex surface on the image side. This photographic lens system has a short total length (a length as measured from a first surface to an image side surface of the lens system and a small value of $\Sigma d$ (a distance as measured from the first surface to a final surface thereof), and is suited for use with collapsible mount type cameras.

28 Claims, 11 Drawing Sheets

FIG.12A
SPHERICAL
ABERRATION

FIG.12B
ASTIGMATISM

FIG.12C
DISTORTION

FIG.12D
LATERAL
CHROMATIC
ABERRATION

FIG.13A SPHERICAL ABERRATION
FIG.13B ASTIGMATISM
FIG.13C DISTORTION
FIG.13D LATERAL CHROMATIC ABERRATION

FIG.14A SPHERICAL ABERRATION
FIG.14B ASTIGMATISM
FIG.14C DISTORTION
FIG.14D LATERAL CHROMATIC ABERRATION

FIG.15A
SPHERICAL ABERRATION

FIG.15B
ASTIGMATISM

FIG.15C
DISTORTION

FIG.15D
LATERAL CHROMATIC ABERRATION

FIG.16A
SPHERICAL ABERRATION

FIG.16B
ASTIGMATISM

FIG.16C
DISTORTION

FIG.16D
LATERAL CHROMATIC ABERRATION

FIG.17A
SPHERICAL ABERRATION

FIG.17B
ASTIGMATISM

FIG.17C
DISTORTION

FIG.17D
LATERAL CHROMATIC ABERRATION

FIG.18A
SPHERICAL ABERRATION

FIG.18B
ASTIGMATISM

FIG.18C
DISTORTION

FIG.18D
LATERAL CHROMATIC ABERRATION

FIG.19A
SPHERICAL ABERRATION

FIG.19B
ASTIGMATISM

FIG.19C
DISTORTION

FIG.19D
LATERAL CHROMATIC ABERRATION

FIG.20A
SPHERICAL ABERRATION

FIG.20B
ASTIGMATISM

FIG.20C
DISTORTION

FIG.20D
LATERAL CHROMATIC ABERRATION

FIG. 21A
SPHERICAL ABERRATION

FIG. 21B
ASTIGMATISM

FIG. 21C
DISTORTION

FIG. 21D
LATERAL CHROMATIC ABERRATION

FIG. 22A
SPHERICAL ABERRATION

FIG. 22B
ASTIGMATISM

FIG. 22C
DISTORTION

FIG. 22D
LATERAL CHROMATIC ABERRATION

WIDE-ANGLE PHOTOGRAPHIC LENS SYSTEM

BACKGROUND OF THE INVENTION

1. Field of the Invention

The present invention relates to a photographic lens system suited for use with lens shutter cameras and so on, and more specifically a wide-angle photographic lens system which has an F number on the order of 2.8 or a high aperture ratio and high optical performance.

2. Description of the Prior Art

The conventional photographic lens system each of which has a single focal point and is configured for use with the lens shutter cameras, etc. generally have field angles on the order of 60° to 64°. Though the triplet type is known well out of the three types of the conventional photographic lens systems, the triplet type photographic lens systems have F numbers which find a limit around 3.5. For this reason, those skilled in the art often select, for photographic lens system for use with the lens shutter cameras, the telephoto type and Tessar type which can have aperture ratios on the order of F/2.8. Known as conventional examples of the telephoto type photographic lens systems are lens systems which are disclosed by Japanese Patents Kokai Publication No. Sho 56-91,206, Kokai Publication No. Sho 57-116,313 and Kokai Publication No. Sho 59-147,312. Further, there are known a large number of conventional examples of telephoto type photographic lens systems other than those disclosed by the Japanese patents mentioned above. Each of these conventional photographic lens systems consists of a front lens unit having a positive refractive power and a rear lens unit having a negative refractive power. This photographic lens system was originally developed as a telephoto lens system, but is currently applied as a wide-angle photographic lens system since this lens system has a merit that it permits locating a principal point thereof at a position close to an object point therefor, whereby this lens system can be configured so as to have a short total length and a telephoto ratio around 1. However, the telephoto type photographic lens system produces astigmatism, curvature of field and distortion in amounts too large for correction in practice. Therefore, the conventional photographic lens systems disclosed by the Japanese patents mentioned above adopt aspherical surfaces on the lens components disposed on the image side for correcting these aberrations. Further, the other conventional photographic lens systems use aspherical surfaces in the front lens units and/or rear lens units for correcting aberrations.

Known as the conventional Tessar type photographic lens systems are lens systems which are disclosed by Japanese Patents Kokai Publication No. Sho 60-176,011 and Kokai Publication No. Hei 2-208,616. Each of these conventional Tessar type photographic lens systems selects a composition in which an aperture stop is disposed on the image side of the lens system for simplifying a mechanism to move the lens units for focusing the photographic lens system. Since the Tessar type photographic lens system has a principal point located therein, this type of photographic lens system has a total length larger than that of the telephoto type photographic lens system and is disadvantageous for configuring a compact camera which is to use this photographic lens system.

Furthermore, a lens system which was disclosed by Japanese Patent Kokai Publication No. Sho 64-90,409 is known as a lens system configured as a modified version of the triplet type photographic lens system. The photographic lens system disclosed by this Japanese patent is a lens system composed of four lens components of four lens elements which are obtained by dividing a third lens component of the triplet type photographic lens system, and has an aperture ratio of F/2.8. Stops are disposed in certain photographic lens systems which are preferred as embodiments of the lens system disclosed by the Japanese patent mentioned above.

On the other hand, known as a conventional example of photographic lens system for use with single-lens reflex cameras is a lens system which was disclosed by Japanese Patent Kokai Publication No. Sho 55-105,216. This photographic lens system consists of the following: (i) a front lens unit which is composed of, in order from the object side, a positive lens component, a positive lens component and a negative lens component; and, (ii) a rear lens unit composed of a positive lens component. That is to say, this photographic lens system consists of four lens components of four lens elements or four lens components of five lens elements, and has a focal length of 40 mm and an aperture ratio of F/3.5.

For configuring a lens shutter camera such that it is compact, it is necessary to shorten a total length of a photographic lens system (a length as measured from a first surface of the lens system to a film surface) which is to be used with the lens shutter camera. A shorter total length of the photographic lens system makes it possible to configure the camera so that it has smaller thickness as a whole and higher optical performance. For this reason, most of the conventional photographic lens systems described above are configured so as to have total lengths as short as possible.

In recent years where lens barrels can be manufactured with high precisions and so as to have sophisticated functions, but cameras are made compacter not only by shortening the lens barrels but also by configuring photographic lens systems so that they can be accommodated into camera bodies. Thickness of a camera, in a condition where it is collapsed, is determined dependently on a total length of a photographic lens system built therein and a distance ($\Sigma d$) as measured from a first surface to a final surface of the photographic lens system. For configuring a camera compacter, it is therefore necessary to shorten both the total length and $\Sigma d$ of a photographic lens system which is to be used with the camera.

For the reason described above, the telephoto type photographic lens systems which have large values of $\Sigma d$ are unsuited for use with the collapsible mount type cameras.

Further, the Tessar type photographic lens systems which have small values of $\Sigma d$ are suited for use with the collapsible mount type cameras, but insufficient in optical performance thereof since these photographic lens systems produce astigmatism and curvature of field in amounts too large for correction even by using aspherical surfaces.

The photographic lens system which was disclosed by Japanese Patent Kokai Publication No. Sho 64-90,409 has a small value of $\Sigma d$ and is advantageous, like the Tessar type photographic lens systems, for use with the collapsible mount type cameras, but produces astigmatism and curvature of field in large amounts and is insufficient in optical performance thereof.

Though the photographic lens system disclosed by Japanese Patent Kokai Publication No. Sho 55-105,216 is configured for use with the lens shutter cameras, this lens system is unsuited for use with the collapsible mount type cameras since the lens system has a large F-number and a large value of $\Sigma d$.

SUMMARY OF THE INVENTION

A primary object of the present invention is to provide a wide-angle photographic lens system which has a short total length, a small value of Σd, a high aperture ratio and excellent optical performance, and is suited for use with the collapsible mount type cameras.

The Tessar type photographic lens system which uses an aperture stop disposed on the image side of the lens system is apt to produce pin cushion type distortion since it comprises the front lens unit having the positive refractive power a rear lens unit having a positive refractive power and an aperture stop, and has a composition asymmetrical with regard to the aperture stop. Since this distortion is corrected by a third surface (an object side surface of a second negative lens component) disposed in the conventional Tessar type photographic lens system, the third surface produces coma and astigmatism, thereby, making it difficult to enhance optical performance of the Tessar type photographic lens system. In a case where the Tessar type photographic lens system has a larger aperture, in particular, it is more difficult to correct these aberrations favorably.

In a fundamental composition of the photographic lens system according to the present invention, both a front lens unit and a rear lens unit have positive refractive powers, and are disposed symmetrically with regard to an aperture stop. In this composition of the photographic lens system, off-axial aberrations are corrected favorably by cancelling the off-axial aberrations produced by the front lens unit with those produced by the rear lens unit. It is further necessary for correcting spherical aberration to compose the front lens unit so as to comprise at least one positive lens component and at least one negative lens component. When the photographic lens system according to the present invention is composed as described above, spherical aberration is corrected by the front lens unit, whereas coma, astigmatism and distortion are corrected by cancelling these aberrations produced by the front lens unit with those produced by the rear lens unit.

On the other hand, it is desirable for reducing a value of Σd of the photographic lens system to compose the rear lens unit of a single lens component and configure this lens component as a cemented lens component for correcting chromatic aberration.

Now, the composition of the rear lens unit will be described below in more detailed.

The wide-angle photographic lens system according to the present invention can be of three types which are different from one another in the composition of the rear lens unit. In case of a first type of the wide-angle photographic lens system, the rear lens unit is composed only of a single meniscus lens component which has a positive refractive power and a convex surface on the object side. In this case, aberrations which are produced by the front lens unit are to be corrected with the rear lens unit and this lens unit must be configured so as to produce aberrations in excessive amounts though these aberrations produce adverse influences on the photographic lens system. In the case of the first type wide-angle photographic lens system, the aberrations can be corrected adequately by selecting the above-described shape of the meniscus lens component for the rear lens unit.

In case of a second type of the wide-angle photographic lens system according to the present invention, the rear lens component is composed of a lens component which is thick on an optical axis and satisfies the following condition (1):

$$0.1 < D_R/f < 0.3 \tag{1}$$

wherein the reference symbol $D_R$ represents thickness of the rear lens unit and the reference symbol f designates a focal length of the photographic lens system as a whole.

The condition (1) defines thickness of the rear lens unit or a total thickness of two lens elements used for composing the rear lens unit when it is configured as a cemented doublet. The condition (1) is required for correcting astigmatism. If the lower limit of the condition (1) is exceeded, astigmatism will be produced in a large amount. If the upper limit of the condition (1) is exceeded, the photographic lens system will have a large value of Σd and cannot be configured compactly though an effect advantageous for correcting astigmatism will be obtained.

A third type of the wide-angle photographic lens system according to the present invention adopts a rear lens unit which has a weak negative refractive power. Though the rear lens unit has the positive refractive power in the fundamental composition of the wide-angle photographic lens system according to the present invention, it is possible to correct the aberrations as favorably as in the cases of the first and second types of the wide-angle photographic lens system even when the rear lens unit has the weak negative refractive power. The third type wide-angle photographic lens system according to the present invention satisfies the following condition (2):

$$f_R/f < -5 \tag{2}$$

wherein the reference symbol $f_R$ represents a focal length of the rear lens unit and the reference symbol f designates a focal length of the photographic lens system as a whole.

If the negative refractive power of the rear lens unit is strong enough to exceed the range defined by the condition (2), the photographic lens system will be of the telephoto type described with reference to the prior art and cannot accomplish the object of the present invention.

For the wide-angle photographic lens system according to the present invention comprising the front lens unit which comprises at least one positive lens component and at least one negative lens component, it is desirable that the front lens unit is composed, in order from the object side, of a first positive lens component, a second negative lens component and a third positive lens component. When the front lens unit is composed as described above, each of the first through third lens components may be composed of a single lens element or configured as a cemented doublet. In this case, aberrations can be corrected more favorably in the wide-angle photographic lens system according to the present invention.

When the front lens unit is of the triplet type of Tessar type, for example, aberrations are produced in large amounts by each lens surface but aberrations produced by different lens surfaces are cancelled with one another, whereby the aberrations are corrected in the front lens unit as a whole. When each of the lens surfaces produces aberrations in large amounts, however, aberrations will remain in rather large amounts. These residual aberrations can be corrected favorably so as to obtain favorably corrected aberrations in the wide-angle photographic lens system as a whole by composing the rear lens unit of a positive meniscus lens component which has a convex surface on the object side.

Further, by composing the front lens unit of three lens components each of which is configured as a meniscus lens component having a convex surface on the object side, it is possible to reduce angles of incidence of off-axial rays and amounts of aberrations to be produced by the lens surfaces. It is therefore possible to correct aberrations much more favorably by reducing the aberrations to be produced by the lens surfaces and composing the rear lens unit of a thick lens component as in the case of the above-described second type of wide-angle photographic lens system according to the present invention.

Furthermore, it is desirable to configure the front lens unit so as to be of the triplet type or Tessar type even in the case of the third type of the wide-angle photographic lens system according to the present invention, that is to say, in the case that the rear lens unit of the lens system has a weak negative refractive power.

Moreover, it is desirable for each of the first type, second type and third type of the wide-angle photographic lens systems according to the present invention that the front lens unit satisfies the following condition (3):

$$0.1 < (r_{2a} - r_{2b})/(r_{2a} + r_{2b}) < 5 \tag{3}$$

wherein the reference symbols $r_{2a}$ and $r_{2b}$ represent radii of curvature on the most object side surface and the most image side surface respectively of the second lens component having the negative refractive power; these surfaces being air-contact surfaces when the second lens component is configured as a cemented component.

The condition (3) defines a shape for the second negative lens component, which must have an image side surface having high curvature, of the front lens unit. If the lower limit of the condition (3) is exceeded, both the surfaces of the negative lens component will have radii of curvature which progressively become equal to each other and have small values, whereby these surfaces will produce aberrations in amounts too large to be corrected by the other lens surfaces. These aberrations cannot be corrected by the other surfaces. If the upper limit of the condition (3) is exceeded, spherical aberration cannot be corrected by the image side surface of the negative lens component and the object side surface of this lens component will produce off-axial aberrations in large amounts, thereby making it difficult to correct aberrations in the wide-angle photographic lens system as a whole.

In addition, it is desirable for the wide-angle photographic lens system according to the present invention to satisfy the following condition (4):

$$1.6 < N_p \tag{4}$$

wherein the reference symbol $N_p$ represents a mean value of refractive indices of all the positive lens elements disposed in the photographic lens system.

The condition (4) is required for adequately correcting curvature of field.

Since Petzval's image surface is tilted underside in the composition selected for the wide-angle photographic lens system according to the present invention, it is necessary to select refractive indices which are high to certain degrees for the positive lens elements so as to satisfy the condition (4).

By selecting the composition which has been described above, the present invention has succeeded in providing the wide-angle photographic lens system having favorably corrected aberrations. In the wide-angle photographic lens system according to the present invention, the pin cushion distortion and negative astigmatism which are produced by the front lens unit are reasonably cancelled with barrel form distortion produced with the rear lens unit. Owing to this correction mode, the wide-angle photographic lens system according to the present invention can assure high and uniform image quality over the entire range of an image surface thereof. Further, by configuring the first lens component of the front lens unit as a meniscus lens component having the convex surface on the object side, it is possible to shift the principal point of the photographic lens system toward the object side so as to permit shortening a total length of the photographic lens system.

Further, for reserving a sufficient amount of marginal rays on the image side of a photographic lens system, it is necessary to enlarge a diameter of a light bundle passing through the lens system. In the case of the triplet type or Tessar type photographic lens system, it is necessary to increase an amount of lower rays which pass through the lens system, but such increase of the lower rays will result in production of coma in a larger amount. It is remarkably effective for correcting this coma to use an aspherical surface or a plurality of aspherical surfaces in the front lens unit. For the correction of coma, it is desirable to select for the aspherical surface or surfaces such a shape or shapes as to strengthen negative refractive power or weaken positive refractive power as portions of the aspherical surface or surfaces are farther from the optical axis.

Further, it is desirable that the first lens component of the front lens unit satisfies the following condition (5):

$$0.8 < r_{1a}/r_{2b} < 2 \tag{5}$$

wherein the reference symbol $r_{1a}$ represents a radius of curvature on the object side surface of the first lens component of the front lens unit; the surface being an air-contact surface when the first lens component is configured as a cemented lens component.

The condition (5) is required for correcting spherical aberration. In the wide-angle photographic lens system according to the present invention, spherical aberration is remarkably undercorrected due to a strong converging function which is imparted to the object side surface of the first lens component of the front lens unit. For correcting this spherical aberration, it is necessary that a strong diverging function is imparted to the image side surface of the second lens component and that the ratio $r_{1a}/r_{2b}$ between radii of curvature on both the surfaces satisfies the condition (5). If the lower limit of the condition (5) is exceeded, spherical aberration will be undercorrected. If the upper limit of the condition (5) is exceeded, in contrast, spherical aberration will be overcorrected.

When the wide-angle photographic lens system according to the present invention adopts the front lens unit composed of three lens components each of which is configured as a meniscus lens component, it is desirable that the front lens unit satisfies the following conditions (6) and (7):

$$-1 < (r_{1b} - r_{2a})/(r_{1b} + r_{2a}) < -0.1 \tag{6}$$

$$-0.6 < (r_{3a} - r_{3b})/(r_{3a} + r_{3b}) < 0 \tag{7}$$

wherein the reference symbol $r_{1b}$ represents a radius of curvature on an image side surface of the first lens component, and the reference symbols $r_{3a}$ and $r_{3b}$ designate radii of curvature on an object side surface and an image side surface respectively of the third lens component; these surfaces being air-contact surfaces when the third lens component is configured as a cemented lens component.

The condition (6) defines a shape of an air lens disposed between the first lens component and the second lens component, and is required for correcting coma, astigmatism and distortion. If the air lens has a refractive power strong enough to exceed the lower limit of the condition (6), an object side surface of the second lens component will produce aberrations in remarkable amounts, thereby making it difficult to correct aberrations favorably in the photographic lens system as a whole. If the air lens has a refractive power weak enough to exceed the upper limit of the condition (6), the aberration correcting function of the front lens unit will be lowered, thereby making it difficult to correct aberrations favorably in the photographic lens system as a whole.

The condition (7) defines a shape of the third lens component. This condition is required for adequately suppressing production of coma in a remarkable amount by the object side surface of the third lens component and production of distortion in a remarkable amount by the image side surface of the third lens unit, thereby correcting aberrations favorably in the photographic lens system as a whole. If the upper limit or the lower limit of the condition (7) is exceeded, the coma or distortion which is produced by the third lens component will be unbalanced.

DETAILED DESCRIPTION OF THE PREFERRED EMBODIMENTS

Now, the wide-angle photographic lens system according to the present invention will be described in more detail below with reference to the preferred embodiments illustrated in the accompanying drawings and given in the form of the following numerical data:

Embodiment 1

$f = 35.0$, $f_B = 26.1$, $F/2.9$, $2\omega = 63.4°$
$r_1 = 14.1000$
  $d_1 = 3.700$   $n_1 = 1.79952$   $\nu_1 = 42.72$
$r_2 = 47.5750$
  $d_2 = 1.800$
$r_3 = -81.2140$
  $d_3 = 1.000$   $n_2 = 1.76182$   $\nu_2 = 26.52$
$r_4 = 12.0220$ (aspherical surface)
  $d_4 = 1.000$
$r_5 = 55.8920$
  $d_5 = 3.000$   $n_3 = 1.83481$   $\nu_3 = 42.72$
$r_6 = -11.3420$
  $d_6 = 1.000$   $n_4 = 1.53172$   $\nu_4 = 48.90$
$r_7 = -106.9860$
  $d_7 = 1.000$
$r_8 = \infty$ (stop)
  $d_8 = 2.000$
$r_9 = -10.4990$
  $d_9 = 1.500$   $n_5 = 1.51633$   $\nu_5 = 64.15$
$r_{10} = -9.0360$ (aspherical surface)
aspherical surface coefficients (4th surface)   $P = 1.0396$, $A_4 = 0.66373 \times 10^{-4}$
      $A_6 = 0.13983 \times 10^{-5}$, $A_8 = -0.97157 \times 10^{-8}$
      $A_{10} = 0.42114 \times 10^{-9}$
(10th surface)  $P = 1.3037$, $A_4 = 0.44302 \times 10^{-4}$
      $A_6 = -0.17498 \times 10^{-5}$, $A_8 = 0.10177 \times 10^{-6}$
      $A_{10} = -0.17446 \times 10^{-8}$
$D_R/f = 0.043$; $f_R/f = 2.660$, $(R_{2a} - r_{2b})/(r_{2a} + r_{2b}) = 1.347$,
$N_p = 1.717$, $r_{1a}/r_{2b} = 1.173$, $(r_{1b} - r_{2a})/r_{1b} + r_{2a}) = -3.829$,
$(r_{3a} - r_{3b})/(r_{3a} + r_{3b}) = -3.188$ Embodiment 2

$f = 35.0$, $f_B = 24.2$, $F/2.9$, $2\omega = 63.4°$
$r_1 = 13.3210$
  $d_1 = 4.000$   $n_1 = 1.78590$   $\nu_1 = 44.18$
$r_2 = 44.8040$ (aspherical surface)
  $d_2 = 1.900$
$r_3 = -47.1350$
  $d_3 = 1.000$   $n_2 = 1.76182$   $\nu_2 = 26.52$
$r_4 = 12.3260$
  $d_4 = 1.200$
$r_5 = 33.2200$
  $d_5 = 3.000$   $n_3 = 1.79952$   $\nu_3 = 42.24$
$r_6 = -14.4170$
  $d_6 = 1.000$   $n_4 = 1.51742$   $\nu_4 = 52.41$
$r_7 = -39.5590$
  $d_7 = 1.000$
$r_8 = \infty$ (stop)
  $d_8 = 2.000$
$r_9 = -10.4140$
  $d_9 = 1.500$   $n_5 = 1.51633$   $\nu_5 = 64.15$
$r_{10} = -10.3300$
aspherical surface coefficients (2th surface)   $P = 1.0000$, $A_4 = 0.97649 \times 10^{-6}$
      $A_6 -0.63052 \times 10^{-7}$,
      $A_8 -0.66268 \times 10^{-9}$, $A_{10} = 0.0000$
$D_R/f = 0.043$, $f_R/f$ 10.009, $(r_{2a} - r_{2b})/(r_{2a} + r_{2b}) = 1.708$
$N_p = 1.701$, $r_{1a}/r_{2b} = 1.081$, $(r_{1b} - r_{2a})/(r_{1b} + r_{2a}) = -39.442$,
$(r_{3a} - r_{3b})/(r_{3a} + r_{3b}) = -11.481$ Embodiment 3

$f = 35.0$, $f_B = 23.9$, $F/2.9$, $2\omega = 63.4°$
$r_1 = 12.2960$
  $d_1 = 3.500$   $n_1 = 1.80400$   $\nu_{i=46.57}$
$r_2 = 31.1960$
  $d_2 = 2.200$
$r_3 = -42.7320$
  $d_3 = 1.000$   $n_2 = 1.76182$   $\nu_2 = 26.52$
$r_4 = 10.9260$
  $d_4 = 0.750$
$r_5 = 22.7090$ (aspherical surface)
  $d_5 = 4.000$   $n_3 = 1.83400$   $\nu_3 = 37.16$
$r_6 = -24.2240$
  $d_6 = 1.000$
$r_7 = \infty$ (stop)
  $d_7 = 2.000$
$r_8 = -9.4810$
  $d_8 = 1.500$   $n_4 = 1.49241$   $\nu_4 = 57.66$
$r_9 = -10.2580$
aspherical surface coefficients $P = 1.0000$, $A_4 = 0.25892 \times 10^{-4}$,
      $A_6 = 0.26583 \times 10^{-5}$, $A_8 = -0.12446 \times 10^{-6}$,
      $A_{10} = 0.25845 \times 10^{-8}$
$D_R/f = 0.043$, $f_R/f = -20.005$, $(r_{2a} - r_{2b})/(r_{2a} + r_{2b}) = 1.687$,
$N_p = 1.819$, $r_{1a}/r_{2b} = 1.125$, $(r_{1b} - r_{2a})/(r_{1b} + r_{2a}) = -6.408$,
$(r_{3a} - r_{3b})/(r_{3a} + r_{3b}) = -30.979$ Embodiment 4

$f = 28.0$, $f_B = 18.8$, $F/2.9$, $2\omega = 75.3°$
$r_1 = 13.3690$ (aspherical surface)
  $d_1 = 5.000$   $n_1 = 1.79952$   $\nu_1 = 42.24$
$r_2 = 43.1940$
  $d_2 = = 1.600$
$r_3 = 590.2440$
  $d_3 = 1.000$   $n_2 = 1.76182$   $\nu_2 = 26.52$
$r_4 = 8.4700$ (aspherical surface)
  $d_4 = 1.100$
$r_5 = 18.4000$
  $d_5 = 3.500$   $n_3 = 1.88300$   $\nu_3 = 40.78$
$r_6 = -19.7190$
  $d_6 = 1.000$   $n_4 = 1.53172$   $\nu_4 = 48.90$
$r_7 = 39.6850$
  $d_7 = 1.000$
$r_8 = \infty$ (stop)
  $d_8 = 1.000$
$r_9 = -20.3110$
  $d_9 = 1.600$   $n_5 = 1.51633$   $\nu_5 = 64.15$
$r_{10} = -10.2600$ (aspherical surface)
aspherical surface coefficients (1st surface)   $P = 1.1021$, $A_4 = -0.22172 \times 10^{-4}$,
      $A_6 = -0.16080 \times 10^{-6}$,
      $A_8 = -0.19674 \times 10^{-9}$, $A_{10} = 0.00000$
(4th surface)   $P = 1.0813$, $A_4 = -0.24969 \times 10^{-4}$, $A_6 = -0.93991 \times 10^{-6}$,
$A_8 = 0.10642 \times 10^{-6}$, $A_{10} = 0.00000$ (10th surface) $P = 1.1596$, $A_4 = -0.63132 \times 10^{-4}$,
$A_6 = -0.12393 \times 10^{-5}$,
$A_8 = 0.62992 \times 10^{-7}$, $A_{10} = 0.00000$ $D_R/f = 0.057$, $f_R/f = 1.360$, $(r_{2a} - r_{2b})/(r_{2a} + r_{2b}) = 0.972$,
$N_p = 1.73$, $r_{1a}/r_{2b} = 1.578$, $(r_{1b} - r_{2a})/(r_{1b} + r_{2a}) = -0.864$,
$(r_{3a} - r_{3b})/(r_{3a} + r_{3b}) = -0.366$ Embodiment 5

$f = 35.0$, $f_B = 26.1$, $f/3.6$, $2\omega = 63.°$
$r_1 = 12.1080$
   $d_1 = 5.300$   $n_1 = 1.77250$   $v_1 = 49.66$
$r_2 = 13.5380$
   $d_2 = 1.700$
$r_3 = -23.9850$
   $d_3 = 1.000$   $n_2 = 1.76182$   $v_2 = 26.52$
$r_4 = 12.5740$ (aspherical surface)
   $d_4 = 0.500$
$r_5 = 13.0530$
   $d_5 = 2.600$   $n_3 = 1.83400$   $v_3 = 37.16$
$r_6 = -18.9810$
   $d_6 = 1.000$
$r_7 = \infty$ (stop)
   $d_7 = 1.000$
$r_8 = -13.3420$ (aspherical surface)
   $d_8 = 1.000$   $n_4 = 1.49241$   $v_4 = 57.66$
$r_9 = -15.8140$ (aspherical surface)

aspherical surface coefficients (4th surface)   $P = 1.0000$, $A_4 = 0.92446 \times 10^{-4}$,
$A_6 = 0.37307 \times 10^{-5}$,
$A_8 = -0.75406 \times 10^{-7}$,
$A_{10} = 0.47145 \times 10^{-9}$ (8th surface)   $P = 0.9875$, $A_4 = 0.69862 \times 10^{-3}$,
$A_6 = -0.12745 \times 10^{-6}$,
$A_8 = 0.84542 \times 10^{-6}$,
$A_{10} = -0.19435 \times 10^{-7}$ (9th surface)   $P = 1.3297$, $A_4 = 0.67651 \times 10^{-3}$,
$A_6 = -0.22540 \times 10^{-5}$,
$A_8 = 0.80052 \times 10^{-6}$,
$A_{10} = -0.11065 \times 10^{-7}$ $D_R/f = 0.029$, $f_R/f = -5.715$, $(r_{2a} - r_{2b})/(r_{2a} + r_{2b}) = 3.204$,
$N_p = 1.803$, $r_{1a}/r_{2b} = 0.963$, $(r_{1b} - r_{2a})/(r_{1b} + r_{2a}) = -3.592$,
$(r_{3a} - r_{3b})/(r_{3a} + r_{3b}) = -5.404$ Embodiment 6

$f = 35.0$, $f_B = 24.6$, $F/2.9$, $2\omega = 63.4°$
$r_1 = 12.7340$
   $d_1 = 3.500$   $n_1 = 1.77250$   $v_1 = 49.66$
$r_2 = 29.8370$
   $d_2 = 1.900$
$r_3 = -54.5190$
   $d_3 = 1.000$   $n_2 = 1.68893$   $v_2 = 31.08$
$r_4 = 11.5210$
   $d_4 = 0.800$
$r_5 = 24.2500$
   $d_5 = 3.000$   $n_3 = 1.80400$   $v_3 = 46.57$
$r_6 = -13.3230$
   $d_6 = 1.000$   $n_4 = 1.53172$   $v_4 = 48.90$
$r_7 = -83.6260$
   $d_7 = 1.000$
$r_8 = \infty$ (stop)
   $d_8 = 2.000$
$r_9 = -10.8870$
   $d_9 = 2.000$   $n_5 = 1.51633$   $v_5 = 64.15$
$r_{10} = -10.8980$ $D_R/f = 0.057$, $f_r/f = 9.799$, $(r_{2a} - r_{2b})/(r_{2a} + r_{2b}) = 1.536$,
$N_p = 1.698$, $r_{1a}/r_{2b} = 1.105$, $(r_{1b} - r_{2a})/(r_{1b} + r_{2a}) = -3.418$,
$(r_{3a} - r_{3b})/(r_{3a} + r_{3b}) = -1.817$ Embodiment 7

$f = 35.0$, $f_B = 26.9$, $F/2.9$, $2\omega = 63.4°$
$r_1 = 15.6950$
   $d_1 = 3.500$   $n_1 = 1.77250$   $v_1 = 49.66$
$r_2 = 39.9440$
   $d_2 = 3.700$
$r_3 = -28.1120$
   $d_3 = 0.800$   $n_2 = 1.72825$   $v_2 = 28.46$
$r_4 = 15.3920$
   $d_4 = 1.000$
$r_5 = 33.2810$
   $d_5 = 2.700$   $n_3 = 1.83481$   $v_3 = 42.72$
$r_6 = -19.5090$
   $d_6 = 1.000$
$r_7 = \infty$ (stop)
   $d_7 = 1.500$
$r_8 = -9.9290$
   $d_8 = 2.000$   $n_4 = 1.72916$   $v_4 = 54.68$
$r_9 = -10.4960$ $D_R/f = 0.057$, $f_R/f = 14.776$, $(r_{2a} - r_{2b})/(r_{2a} + r_{2b}) = 3.420$,
$N_p = 1.779$, $r_{1a}/r_{2b} = 1.020$, $(r_{1b} - r_{2a})/(r_{1b} + r_{2a}) = 5.752$,
$(r_{3a} - r_{3b})/(r_{3a} + r_{3b}) = 3.833$ Embodiment 8

$f = 100$, $f_B = 62.16$, $F/2.9$, $2\omega = 64.4°$
$r_1 = 27.9430$ (aspherical surface)
   $d_1 = 8.6500$   $n_1 = 1.77250$   $v_1 = 49.66$
$r_2 = 51.2630$
   $d_2 = 2.0700$
$r_3 = 107.2150$
   $d_3 = 2.9600$   $n_2 = 1.64769$   $v_2 = 33.80$
$r_4 = 23.3080$ (aspherical surface)
   $d_4 = 3.3900$
$r_5 = 38.6670$
   $d_5 = 5.9900$   $n_3 = 1.83481$   $v_3 = 42.72$
$r_6 = 978.6600$
   $d_6 = 2.9600$   $n_4 = 1.67270$   $v_4 = 32.10$
$r_7 = 59.3970$ (aspherical surface)
   $d_7 = 4.4400$
$r_8 = \infty$ (stop)
   $d_8 = 3.1000$
$r_9 = 2217.5780$
   $d_9 = 16.7600$   $n_5 = 1.77250$   $v_5 = 49.66$
$r_{10} = -145.0250$ (aspherical surface)

aspherical surface coefficients (1st surface)   $P = 1.0000$, $A_4 = -0.70423 \times 10^{-8}$,
$A_6 = -0.63984 \times 10^{-10}$,
$A_8 = 0.26951 \times 10^{-12}$,
$A_{10} = 0.48715 \times 10^{-15}$ (4th surface)   $P = 0.7541$, $A_4 = 0.50131 \times 10^{-5}$,
$A_6 = -0.87449 \times 10^{-8}$,
$A_8 = 0.96677 \times 10^{-10}$,
$A_{10} = -0.13800 \times 10^{-12}$ (7th surface)   $P = 1.0000$, $A_4 = 0.19813 \times 10^{-6}$,
$A_6 = -0.57451 \times 10^{-9}$,
$A_8 = -0.52665 \times 10^{-11}$,
$A_{10} = 0.38267 \times 10^{-14}$ (10th surface)   $P = 1.0000$, $A_4 = 0.13632 \times 10^{-6}$,
$A_6 = -0.56110 \times 10^{-9}$,
$A_8 = -0.20035 \times 10^{-12}$,
$A_{10} = 0.19542 \times 10^{-14}$ $D_R/f = 0.168$, $(r_{1b} - r_{2a})/(r_{1b} + r_{2a}) = -0.353$
$N_p = 1.793$, $r_{1a}/r_{2b} = 1.199$, $f_R/f = 1.768$
$(r_{2a} - r_{2b})/(r_{2a} + r_{2b}) = 0.643$
$(r_{3a} - r_{3b})/(r_{3a} + r_{3b}) = -0.211$ Embodiment 9

$f = 100$, $f_B = 62.22$, $F/2.9$, $2\omega = 64.4°$
$r_1 = 27.3380$
   $d_1 = 8.9200$   $n_1 = 1.77250$   $v_1 = 49.66$
$r_2 = 44.8430$
   $d_2 = 1.7500$
$r_3 = 68.1190$
   $d_3 = 2.9600$   $n_2 = 1.69895$   $v_2 = 30.12$
$r_4 = 24.1910$ (aspherical surface)
   $d_4 = 5.9200$
$r_5 = 40.7890$
   $d_5 = 6.2900$   $n_3 = 1.83481$   $v_3 = 42.72$
$r_6 = -785.4460$
   $d_6 = 2.9600$   $n_4 = 1.60342$   $v_4 = 38.01$
$r_7 = 47.9990$
   $d_7 = 2.9600$
$r_8 = \infty$ (stop)
   $d_8 = 3.1000$
$r_9 = -712.5610$
   $d_9 = 15.3600$   $n_5 = 1.61800$   $v_5 = 63.38$
$r_{10} = -96.9650$ -continued aspherical surface coefficients P = 0.9680, $A_4$ = 0.30247 × $10^{-5}$,
$A_6$ = 0.31266 × $10^{-8}$, $A_8$ = 0.32717 × $10^{-10}$,
$A_{10}$ = −0.26578 × $10^{-13}$
$D_R/f$ = 0.154, $(r_{1b} - r_{2a})/(r_{1b} + r_{2a})$ = −0.206
$N_p$ = 1.742, $r_{1a}/r_{2b}$ = 1.130, $f_R/f$ = 1.799
$(r_{2a} - r_{2b})/(r_{2a} + r_{2b})$ = 0.476
$(r_{3a} - r_{3b})/(r_{3a} + r_{3b})$ = −0.081

Embodiment 10 f = 100, $f_B$ = 68.00, F/2.9, 2ω = 64.40
$r_1$ = 31.2770
  $d_1$ = 10.7200  $n_1$ = 1.77250  $v_1$ = 49.66
$r_2$ = 106.4350
  $d_2$ = 1.4800
$r_3$ = 274.6030
  $d_3$ = 2.9300  $n_2$ = 1.67270  $v_2$ = 32.10
$r_4$ = 27.0140 (aspherical surface)
  $d_4$ = 6.8600
$r_5$ = 65.6480
$d_5$ = 6.8000  $n_3$ = 1.80440  $v_3$ = 39.58
$r_6$ = 87.6500
  $d_6$ = 2.3700
$r_7$ = ∞ (stop)
  $d_7$ = 1.1800
$r_8$ = 302.3190
  $d_8$ = 9.1300  $n_4$ = 1.77250  $v_4$ = 49.66
$r_9$ = −33.7000
  $d_9$ = 2.9600  $n_5$ = 1.54869  $v_5$ = 45.55
$r_{10}$ = 1794.2090 aspherical surface coefficients

P = 0.9201, $A_4$ = 0.28017 × $10^{-5}$,
$A_6$ = 0.66547 × $10^{-8}$, $A_8$ = −0.41277 × $10^{-12}$,
$A_{10}$ = 0.18896 × $10^{-13}$
$D_r/f$ = 0.121, $(r_{1b} - r_{2a})/(r_{1b} + r_{2a})$ = −0.441
$N_p$ = 1.783, $r_{1a}/r_{2b}$ = 1.158, $f_R/f$ = 1.135
$(r_{2a} - r_{2b})/(r_{2a} + r_{2b})$ = 0.821
$(r_{3a} - r_{3b})/(r_{3a} + r_{3b})$ = −0.144

Embodiment 11 f = 100, $f_B$ = 60.88, F/2.9, 2ω = 64.4°
$r_1$ = 30.2190
  $d_1$ = 10.1700  $n_1$ = 1.77250  $v_1$ = 49.66
$r_2$ = 89.6470
  $d_2$ = 2.0700
$r_3$ = 284.9810
  $d_3$ = 2.9600  $n_2$ = 1.64769  $v_2$ = 33.80
$r_4$ = 22.6830 (aspherical surface)
  $d_4$ = 1.7000
$r_5$ = 30.8330
  $d_5$ = 4.0400  $n_3$ = 1.80440  $v_3$ = 39.58
$r_6$ = 41.9860
  $d_6$ = 6.5200
$r_7$ = ∞ (stop)
  $d_7$ = 0.2600
$r_8$ = 145.2110
  $d_8$ = 4.8700  $n_4$ = 1.77250  $v_4$ = 49.66
$r_9$ = −91.6240
  $d_9$ = 17.7100  $n_5$ = 1.71736  $v_5$ = 29.51
$r_{10}$ = −247.6530 aspherical surface coefficients

P = 0.9033, $A_4$ = 0.25938 × $10^{-5}$
$A_6$ = −0.60442 × $10^{-8}$, 0.43368 × $10^{-10}$,
$A_{10}$ = −0.62848 × $10^{-13}$
$D_R/f$ = 0.226, $(r_{1b} - r_{2a})/(r_{1b} + r_{2a})$ = −0.521
$N_p$ = 1.783, $r_{1a}/r_{2b}$ = 1.332, $f_R/f$ = 1.164
$(r_{2a} - r_{2b})/(r_{2a} + r_{2b})$ = 0.853
$(r_{3a} - r_{3b})/(r_{3a} + r_{3b})$ = −0.153 wherein the reference symbols $r_1$, $r_2$, . . . represent radii of curvature on respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, and the reference symbols $v_1$, $v_2$, . . . represent Abbe's numbers of the respective lens elements.

The first, second, third, fifth, sixth and seventh embodiments of the wide-angle photographic lens system according to the present invention have compositions illustrated in FIGS. 1, 2, 3, 5, 6 and 7 respectively, in each of which the wide-angle photographic lens system consists of the following (i): a front lens unit which is composed, in order from the object side, of a first meniscus lens component having a convex surface on the object side, a second biconcave lens component and a third biconvex lens component; (ii) an aperture stop; and, (iii) a rear lens unit which is composed only of a single lens component. In other words, the wide-angle photographic lens system preferred as each of these embodiment consists of four lens components of four lens elements or four lens components of five lens elements. The first embodiment uses two aspherical surfaces, the second embodiment adopts a single aspherical surface, the third embodiment employs a single aspherical surface, the fifth embodiment uses three aspherical surfaces, the sixth embodiment adopts a single aspherical surface and the seventh embodiment employs a single aspherical surface.

Out of these embodiments, each of the first, second, third, sixth and seventh embodiments has a focal length of 35 mm and an aperture ratio of F/2.9, whereas the fifth embodiment has a focal length of 35 mm and an aperture ratio of F/3.6.

Further, the fourth, eighth, ninth, tenth and eleventh embodiments have compositions illustrated in FIGS. 4, 8, 9, 10 and 11 respectively. Each of the wide-angle photographic lens systems preferred as these embodiments consists of the following (i): a front lens unit which is composed of a meniscus lens component having a convex surface on the object side, a second meniscus lens component having a convex surface on the object side, and a third meniscus lens component having a convex surface on the object side; (ii) an aperture stop; and, (iii) a rear lens component which is composed of a single lens element or a cemented lens component. In other words, the wide-angle photographic lens system preferred as each of these embodiments consists of four lens components of four lens elements or four lens component of five lens elements. Out of these embodiments, the fourth embodiment uses a single aspherical surface as the third surface, the eighth embodiment adopts a single aspherical surface as the fourth lens surface, and each of the ninth, tenth and eleventh embodiments employs a single aspherical surface as the first lens surface.

Figure 1:
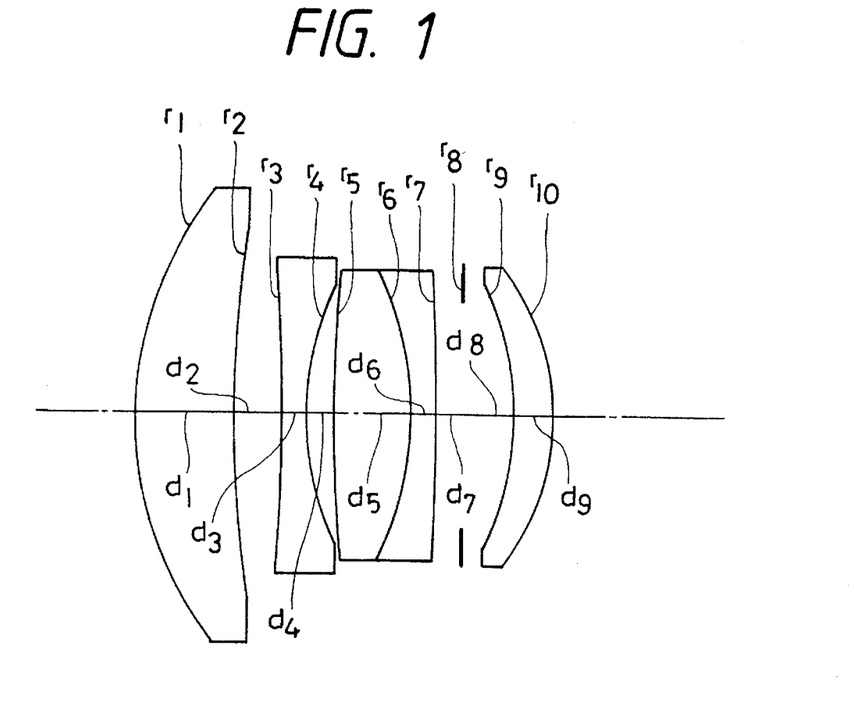
FIG. 1 through FIG. 11 show sectional views illustrating compositions of a first embodiment through an eleventh embodiment respectively of the wide-angle photographic lens system according to the present invention.
Figure 2:
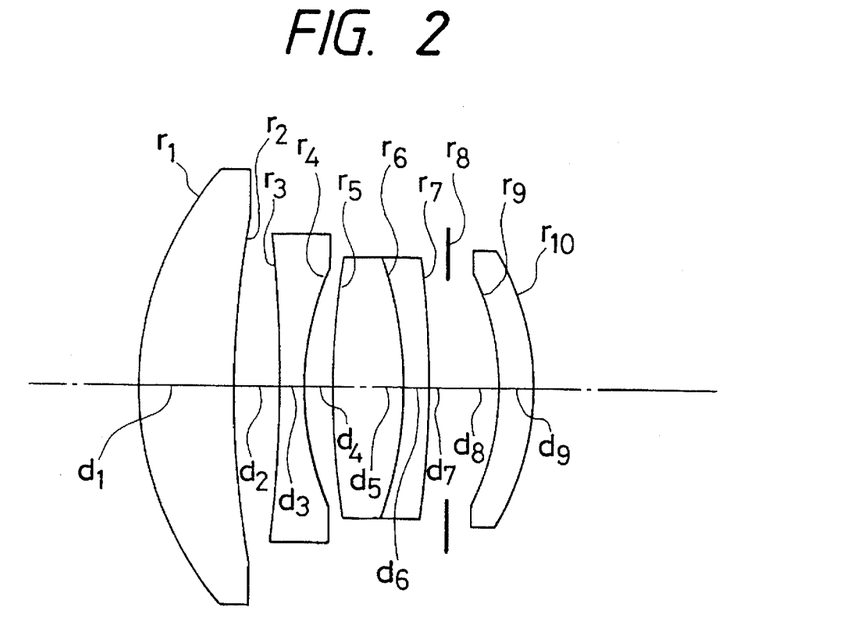
Figure 3:
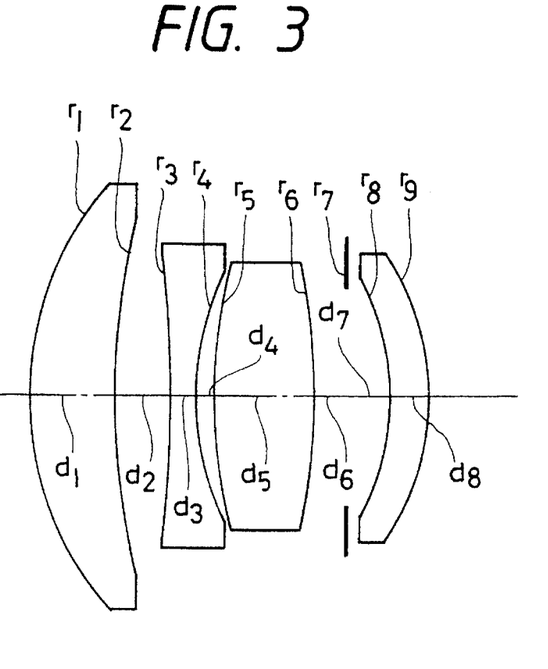
Figure 4:
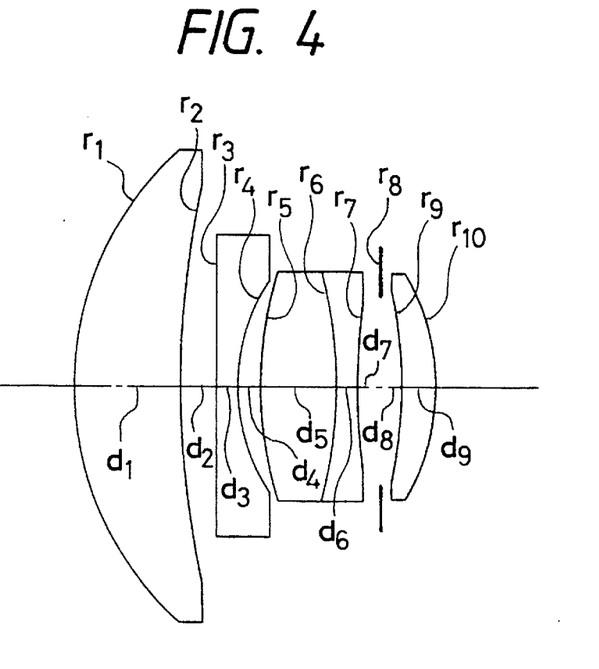
Figure 5:
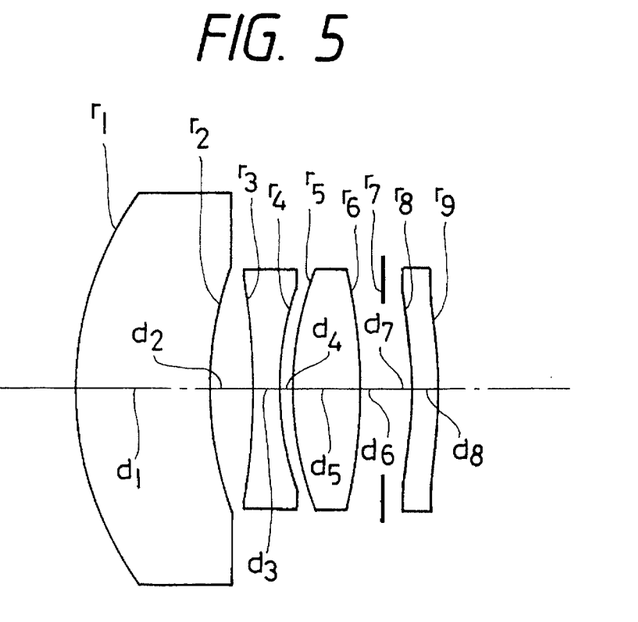
Figure 6:
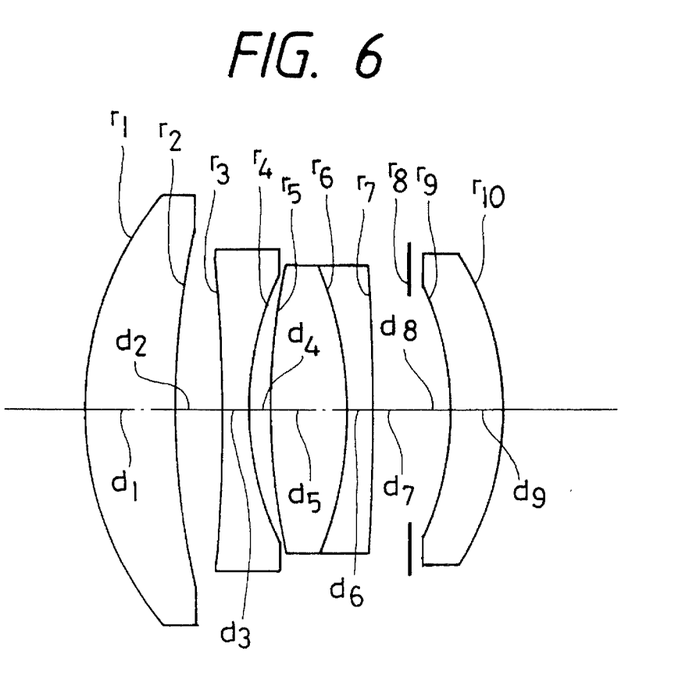
Figure 7:
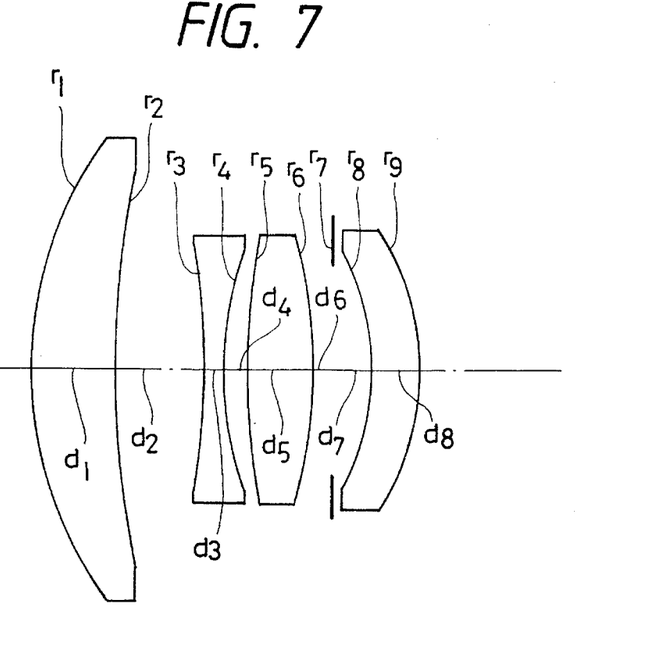
Figure 8:
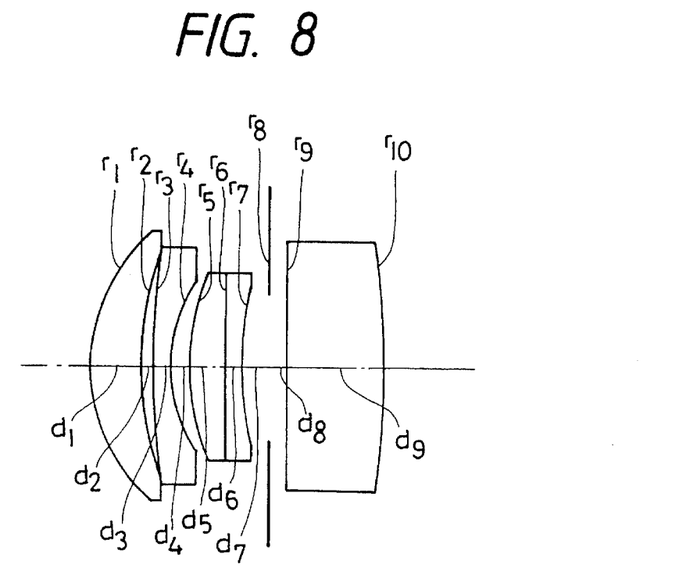
Figure 9:
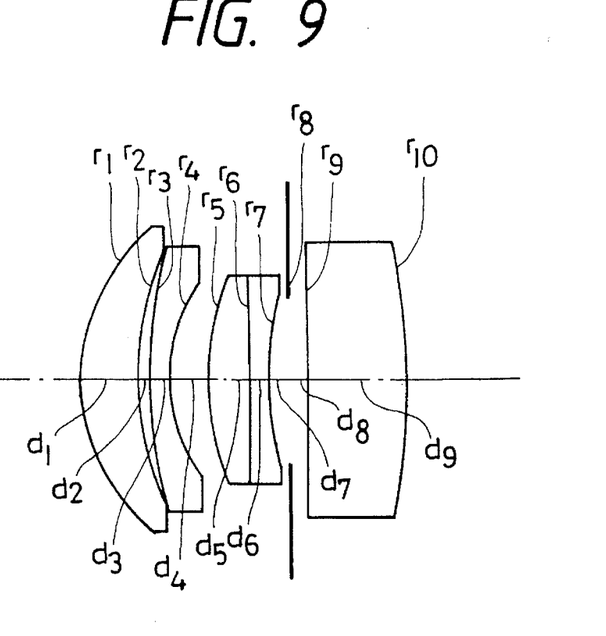
Figure 10:
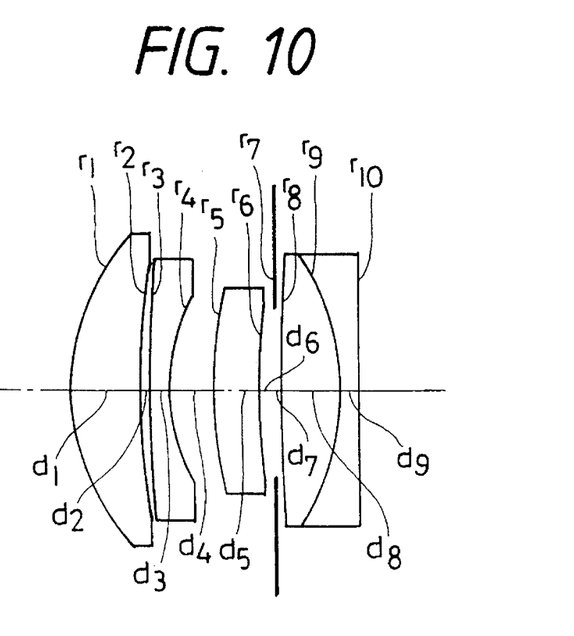
Figure 11:
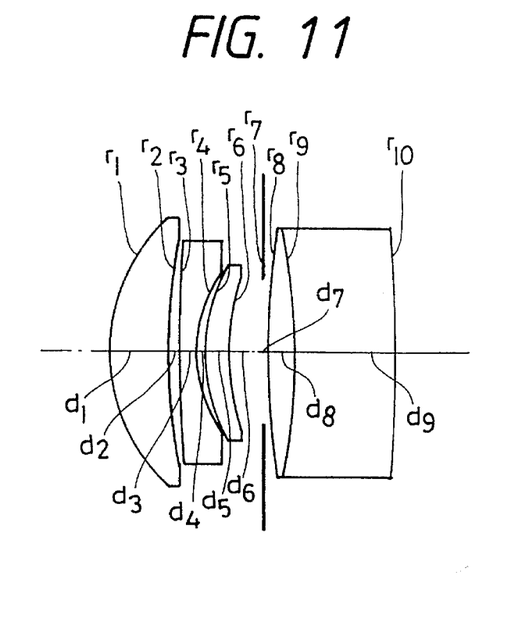
Figures 12A, 12B, 12C:
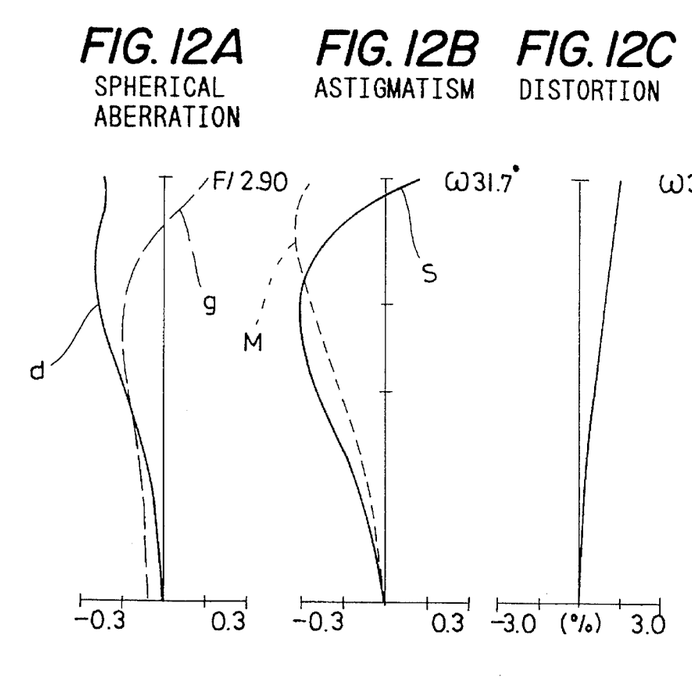
FIG. 12 through FIG. 22 show graphs illustrating aberration characteristics of the first through eleventh embodiments of the present invention.
Figure 12D:
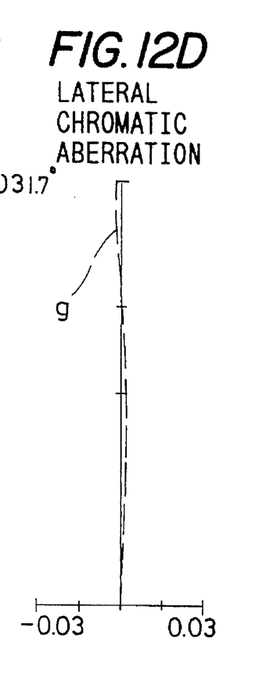
Figure 13A:
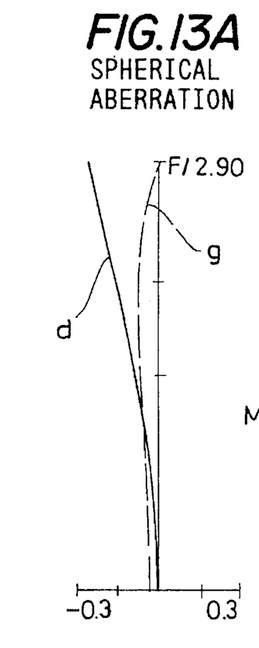
Figure 13B:
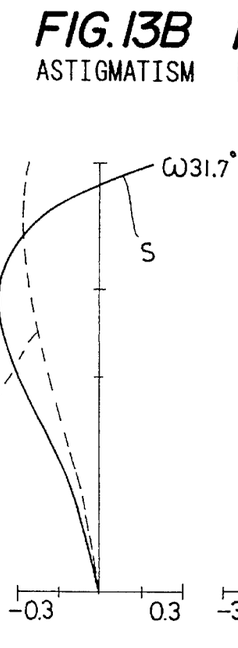
Figure 13C:
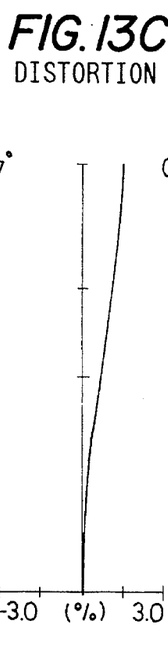
Figure 13D:
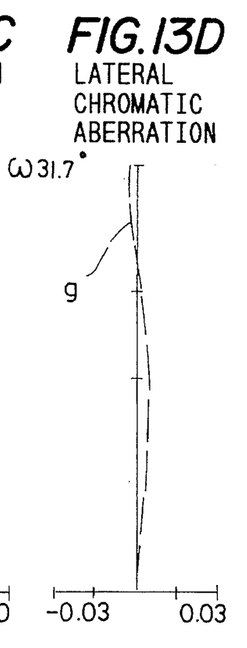
Figure 14A:
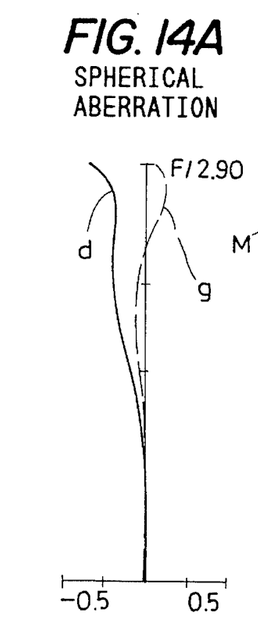
Figures 14B, 14C:
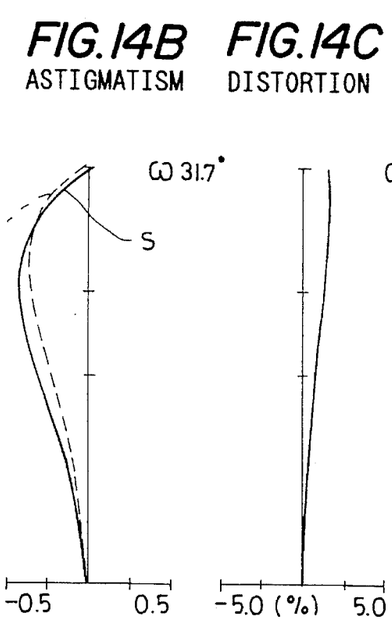
Figure 14D:
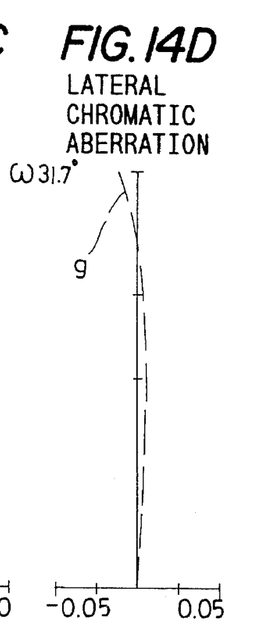
Figures 15A, 15B, 15C, 15D:
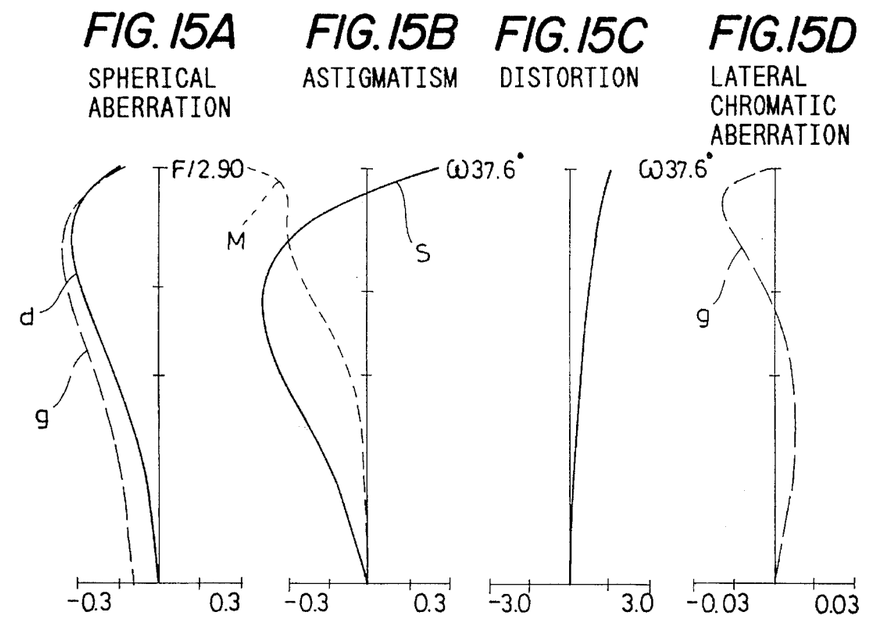
Figure 16A:
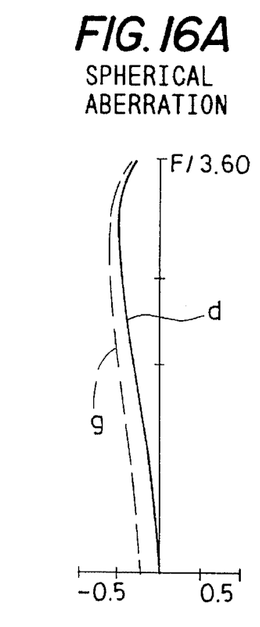
Figures 16B, 16C, 16D:
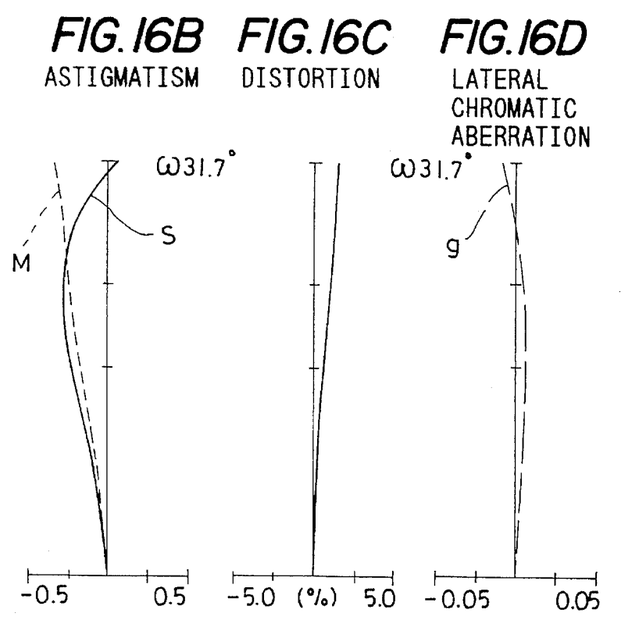
Figure 17A:
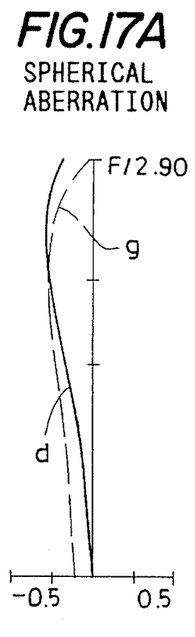
Figures 17B, 17C, 17D:
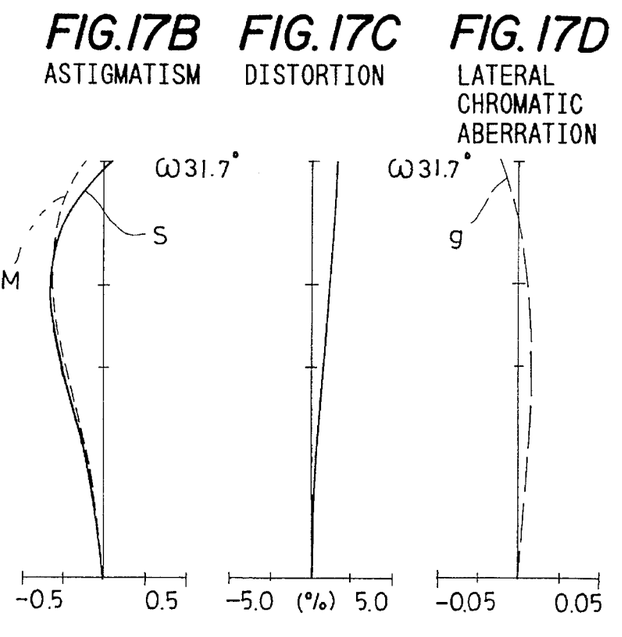
Figure 18A:
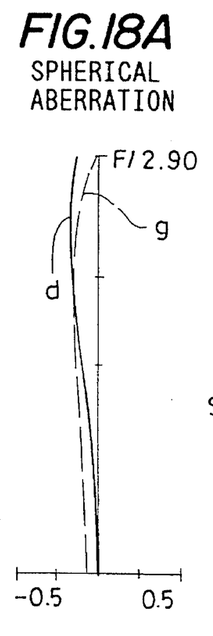
Figures 18B, 18C, 18D:
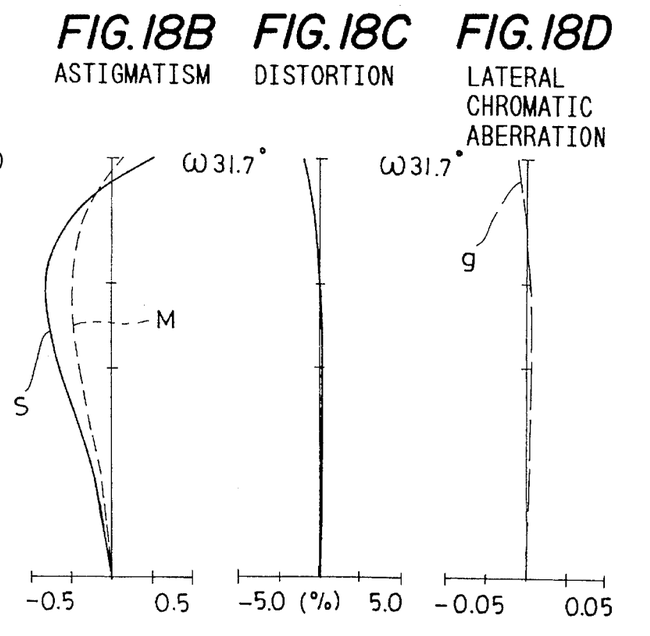
Figure 19A:
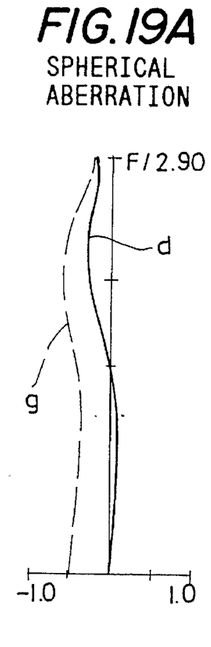
Figure 19B:
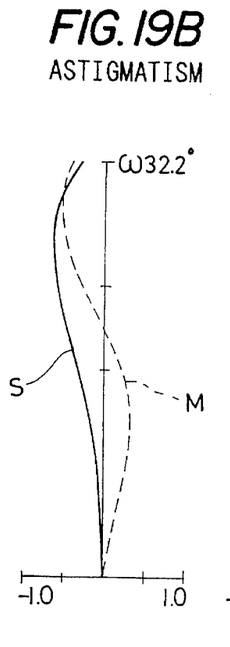
Figures 19C, 19D:
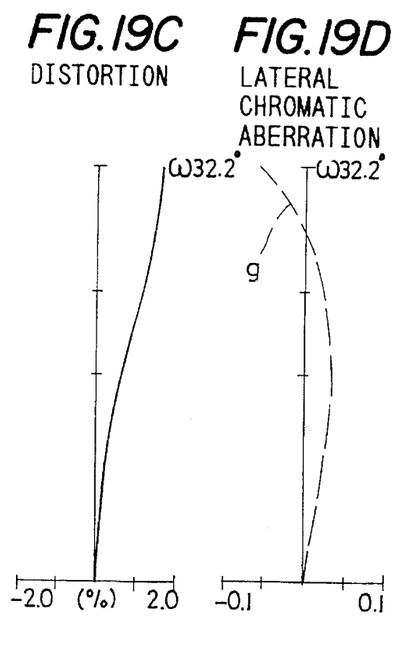
Figure 20A:
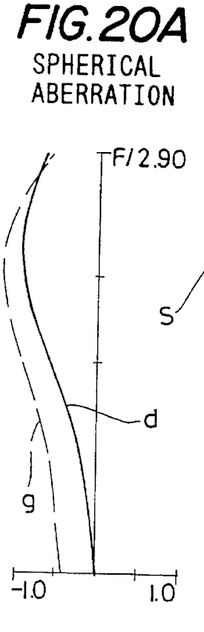
Figure 20B:
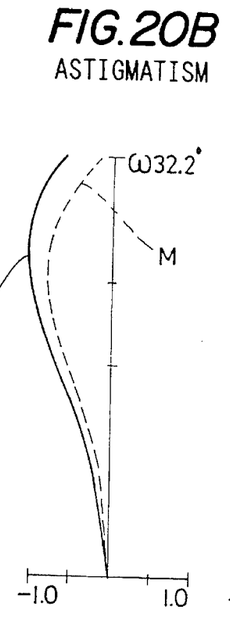
Figures 20C, 20D:
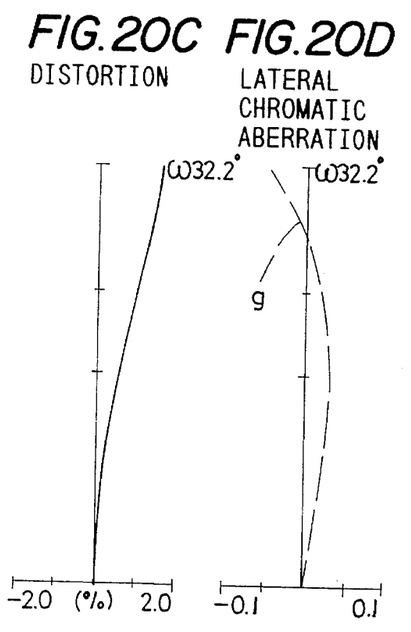
Figure 21A:
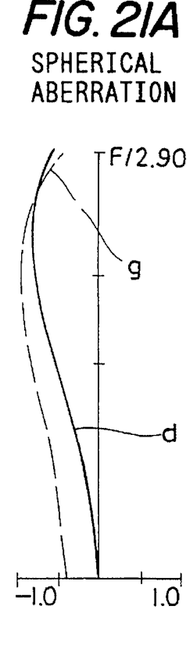
Figure 21B:
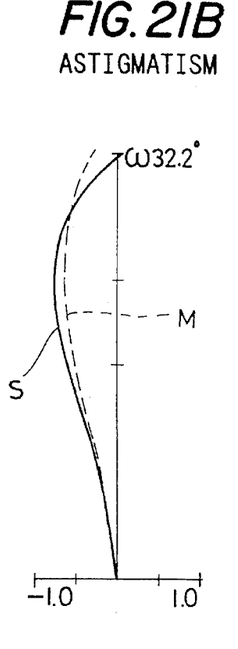
Figures 21C, 21D:
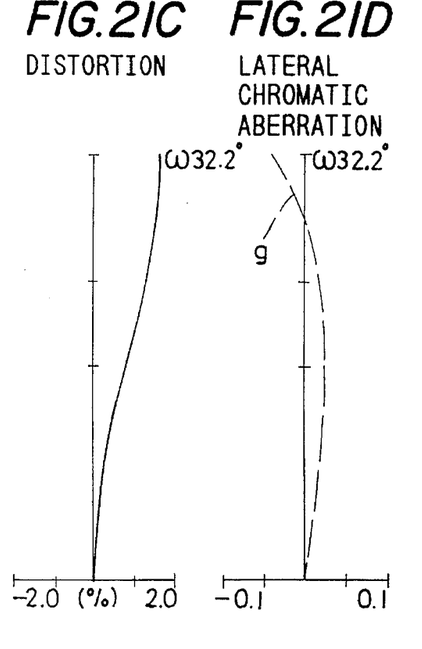
Figure 22A:
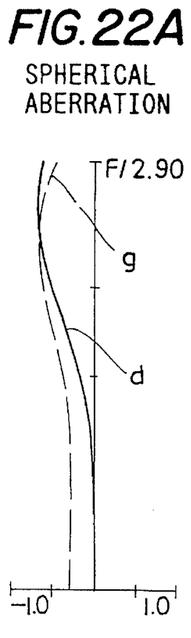
Figure 22B:
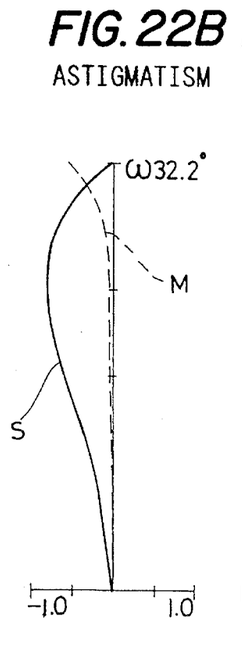
Figures 22C, 22D:
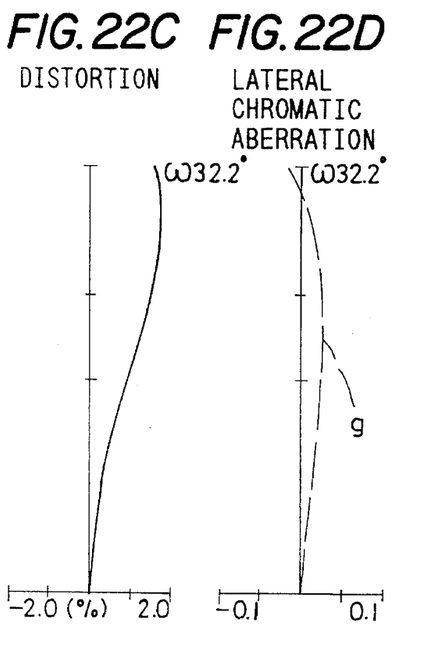

Further, the rear lens unit has a weak negative refractive power in each of the third and fifth embodiments out of the first through eleventh embodiments described above. In addition, the positive lens component or lens element which is to be disposed in the rear lens unit can be made of a resin material such as a plastic material. In a case where the rear lens unit has a weak refractive power as in the second, third, fifth, sixth or seventh embodiment, it is desirable that the positive lens component or lens element is made of a plastic material so as to lessen influences due to temperature and humidity variations and reduce manufacturing cost of the wide-angle photographic lens system according to the present invention.

The aspherical surfaces used in the embodiments of the present invention described above have shapes which are expressed by the formula shown below:

$$z = \frac{y^2/r}{1 + \sqrt{1 - p(y/r)^2}} + A_4 y^4 + A_6 y^6 + A_8 y^8 + A_{10} y^{10}$$

wherein the z axis is taken in the direction where rays travel along the optical axis, the y axis is taken as a direction perpendicular to the optical axis, the reference symbol r represents a paraxial radius of curvature, and the reference symbols p, $A_4$, $A_6$, $A_8$ and $A_{10}$ designate aspherical surface coefficients.

We claim:

1. A wide-angle photographic lens system comprising, in order from object to image side:

a front lens unit having a positive refractive power, an aperture stop and a rear lens unit;

wherein a distance between said front lens unit and said aperture stop and a distance between said aperture stop and said rear lens unit are substantially constant, wherein said front lens unit comprises at least one positive lens component and at least one negative lens component, wherein said rear lens unit consists of a positive meniscus lens component having a convex surface on the image side, and wherein a relative distance between lens components included in said front lens unit and a relative distance between lens components included in said rear lens unit are substantially constant.

2. A wide-angle photographic lens system according to claim 1 wherein said front lens unit comprises a first positive lens component, a second negative lens component and a third positive lens component.

3. A wide-angle photographic lens system according to claim 2 wherein said first positive lens component is a meniscus lens component having a convex surface on the object side, said second negative lens component is a meniscus lens component having a convex surface on the object side and said third positive lens component is a biconvex lens component.

4. A wide-angle photographic lens system according to claim 3 wherein said third positive lens component is a cemented doublet.

5. A wide-angle photographic lens system according to claim 3 wherein each component disposed in said front lens unit and said rear lens unit is a single lens.

6. A wide-angle photographic lens system according to claim 2 wherein said front lens unit comprises an aspherical surface.

7. A wide-angle photographic lens system according to claim 2 wherein said first positive lens component is a meniscus lens component having a convex surface on the object side, said second negative lens component is a meniscus lens component having a convex surface on the object side and said third positive lens component is a meniscus lens component having a convex surface on the object side.

8. A wide-angle photographic lens system according to claim 7 wherein said third positive lens component is a cemented doublet.

9. A wide-angle photographic lens system according to claim 7 wherein said front lens unit comprises a plurality of aspherical surfaces.

10. A wide-angle photographic lens system according to claim 7 wherein each of said front lens unit and said rear lens unit comprises an aspherical surface.

11. A wide-angle photographic lens system comprising, in order from the object side: a front lens unit having a positive refractive power, an aperture stop, and a rear lens unit; wherein said front lens unit comprises at least one positive lens component and at least one negative lens component, and wherein said rear lens unit comprises a lens component which has thickness $D_R$ satisfying the following condition (1):

$$0.1 < D_R/f < 0.3 \qquad (1)$$

wherein the reference symbol f represents a focal length of said photographic lens system as a whole.

12. A wide-angle photographic lens system according to claim 11 wherein said front lens unit comprises a first positive lens component, a second negative lens component and a third positive lens component.

13. A wide-angle photographic lens system according to claim 12 wherein said first positive lens component is a meniscus lens component having a convex surface on the object side, said second negative lens component is a meniscus lens component having a convex surface on the object side and said third positive lens component is a meniscus lens component having a convex surface on the object side.

14. A wide-angle photographic lens system according to claim 12 wherein said third positive lens component is a cemented doublet.

15. A wide-angle photographic lens system according to claim 12 wherein each of the lens components which are disposed in said front lens unit and said rear lens unit composing said photographic lens system is composed of a single lens element.

16. A wide-angle photographic lens system according to claim 11 wherein said lens component comprised in said rear lens unit is a cemented lens component.

17. A wide-angle photographic lens system according to claim 12 wherein said front lens unit comprises an aspherical surface.

18. A wide-angle photographic lens system comprising, in order from the object side: a front lens unit having a positive refractive power, an aperture stop and a rear lens unit having a weak negative refractive power; wherein said front lens unit comprises at least one positive lens component and at least one negative lens component, and wherein said rear lens unit satisfies the following condition (2):

$$f_R/f < -5 \qquad (2)$$

wherein the reference symbol $f_R$ represents a focal length of said rear lens unit and the reference symbol f designates a focal length of said photographic lens system as a whole.

19. A wide-angle photographic lens system according to claim 18 wherein said front lens unit comprises a first positive lens component, a second negative lens component and a third positive lens component.

20. A wide-angle photographic lens system according to claim 19 wherein said first positive lens component is a meniscus lens component having a convex surface on the object side, said second negative lens component is a biconcave lens component and said third positive lens component is a biconvex lens component.

21. A wide-angle photographic lens system according to claim 3, 7, 13 or 20 wherein said second negative lens component satisfies the following condition (3):

$$(3) \quad 0.1 < (r_{2a} - r_{2b})/(r_{2a} + r_{2b}) < 5$$

wherein the reference symbols $r_{2a}$ and $r_{2b}$ represent radii of curvature on an object side surface and an image side surface respectively of said second negative lens component.

22. A wide-angle photographic lens system according to claim 21 further satisfying the following condition (4):

$$1.6 < N_p \qquad (4)$$

wherein the reference symbol $N_p$ represents a mean value of refractive indices of all the lens elements which are disposed in said photographic lens system.

23. A wide-angel photographic lens system according to claim 21 satisfying the following condition (5):

$$0.8 < r_{1a}/r_{2b} < 2 \qquad (5)$$

wherein the reference symbol $r_{1a}$ represents a radius of curvature on an object side surface of said first lens component.

24. A wide-angle photographic lens system according to claim 7 or 13 satisfying the following conditions (6) and (7):

$$-1 < (r_{1b} - r_{2a})/(r_{1b} + r_{2a}) < -0.1 \qquad (6)$$

$$-0.6 < (r_{3a} - r_{3b})/(r_{3a} + r_{3b}) < 0 \qquad (7)$$

wherein the reference symbol $r_{1b}$ represents a radius of curvature on an image side surface of said first positive lens component, the reference symbol $r_{2a}$ designates a radius of curvature on an object side surface of said second negative lens component, the reference symbol $r_{3a}$ denotes a radius of curvature on an object side surface of said third positive lens component and the reference symbol $r_{3b}$ represents a radius of curvature on an image side surface of said third positive lens component.

25. A wide-angle photographic lens system comprising, in order from the object side:

a front lens unit having a positive refractive power, an aperture stop and a rear lens unit;

wherein said front lens unit comprises a first positive lens component, a second negative lens component and a third positive lens component, wherein said first positive lens component is a meniscus lens component having a convex surface on the object side, said second negative lens component is a meniscus lens component having a convex surface on the object side and said third positive lens component is a meniscus lens component having a convex surface on the object side, and wherein said rear lens unit consists of a positive meniscus lens component having a convex surface on the image side.

26. A wide-angle photographic lens system according to claim 25 wherein said third positive lens component is a cemented doublet.

27. A wide-angle photographic lens system according to claim 25 wherein said front lens unit comprises a plurality of aspherical surfaces.

28. A wide-angle photographic lens system according to claim 25 wherein each of said front lens unit and said rear lens unit comprises an aspherical surface.

\* \* \* \* \*